United States Patent
Epshetsky et al.

(10) Patent No.: US 8,851,481 B2
(45) Date of Patent: Oct. 7, 2014

(54) SEAL ASSEMBLY WITH PRE-STRAINED SEALING MEMBER

(75) Inventors: Yefim Epshetsky, Schaumburg, IL (US); Alex Paykin, Buffalo Grove, IL (US); Michel Organisciak, Utrecht (NL)

(73) Assignee: Aktiebolaget SKF, Gothenburg (SE)

( * ) Notice: Subject to any disclaimer, the term of this patent is extended or adjusted under 35 U.S.C. 154(b) by 314 days.

(21) Appl. No.: 13/267,575

(22) Filed: Oct. 6, 2011

(65) Prior Publication Data

US 2013/0087976 A1     Apr. 11, 2013

(51) Int. Cl.
    *F16J 15/32*     (2006.01)

(52) U.S. Cl.
    CPC ............ *F16J 15/328* (2013.01); *F16J 15/3208* (2013.01)
    USPC .......................... 277/572; 277/551; 277/560

(58) Field of Classification Search
    USPC .......................... 277/549, 551, 560, 572, 309
    See application file for complete search history.

(56) References Cited

U.S. PATENT DOCUMENTS

| 6,840,521 | B2 * | 1/2005 | Ikeda | 277/551 |
| 8,256,772 | B2 * | 9/2012 | Itadani et al. | 277/353 |
| 2003/0075872 | A1 * | 4/2003 | Ikeda | 277/560 |
| 2010/0244389 | A1 * | 9/2010 | Sanada et al. | 277/565 |
| 2011/0215536 | A1 * | 9/2011 | Itadani et al. | 277/562 |

\* cited by examiner

*Primary Examiner* — Gilbert Lee
(74) *Attorney, Agent, or Firm* — Mark A. Ussai; SKF USA Inc. Patent Department

(57) ABSTRACT

A seal for sealing a space between a shaft and a housing, includes a base member coupled with one of the housing and the shaft and a generally annular, elastomeric sealing member sealingly contactable with the other one of the housing and the shaft. The sealing member is coupled with the base member such that the sealing member is circumferentially strained to reduce friction between the sealing member and the other one of the housing and the shaft. The seal assembly is preferably formed by providing a base member having a generally annular carrier portion and a generally annular, elastomeric sealing member, coupling the sealing member with the annular portion of the base member, and plastically deforming at least a section of the base member carrier portion such that the sealing member is circumferentially strained.

14 Claims, 5 Drawing Sheets

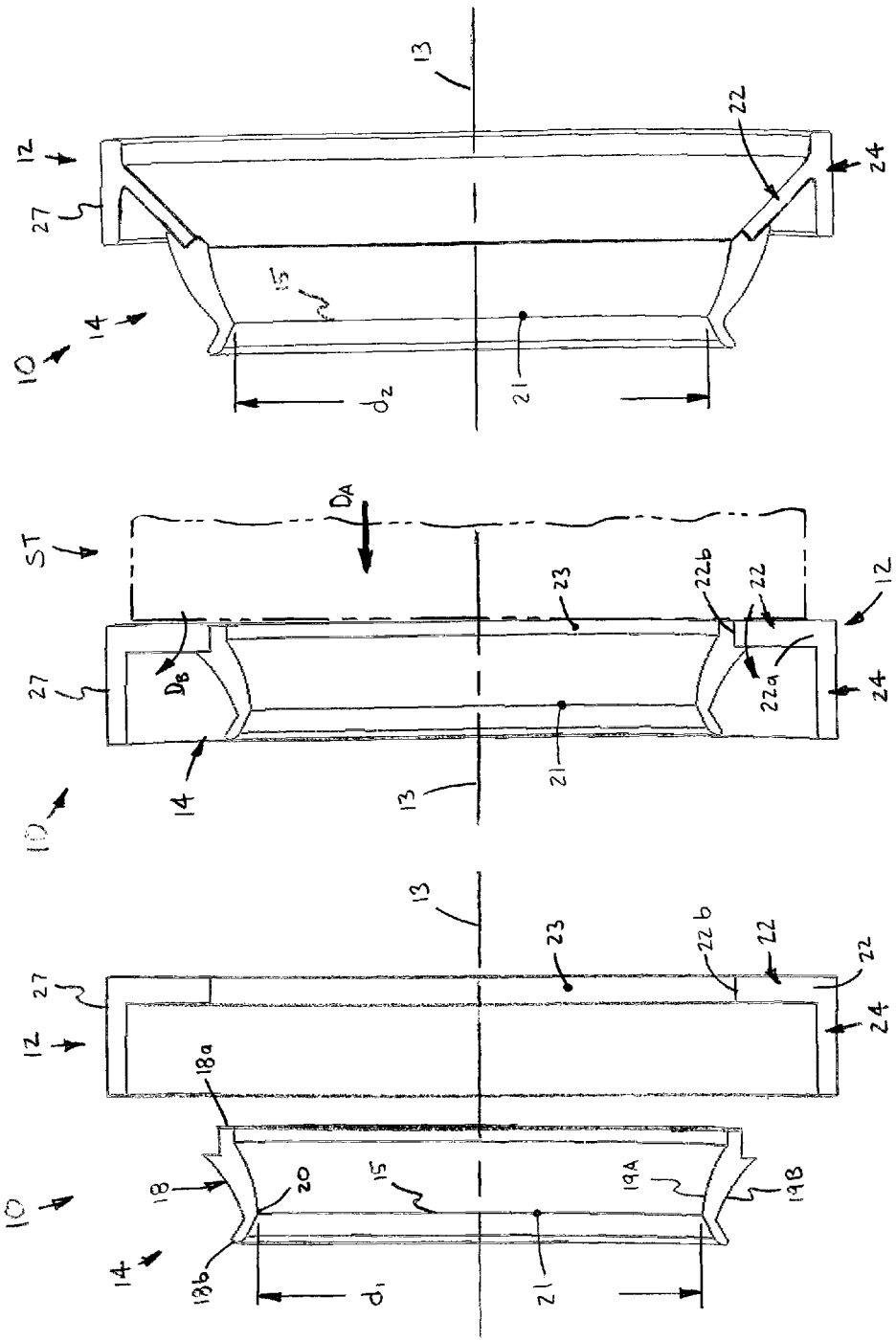

SEAL ASSEMBLY WITH PRE-STRAINED SEALING MEMBER

The present invention relates to seals, and more particularly to contact seal assemblies with elastomeric sealing members.

Sealing assemblies for sealing a space between a shaft and housing are generally known and typically include an annular base member and an annular elastomeric sealing member coupled with the base member. Typically, the base member is fixedly connected with the housing and the sealing member has an inner circumferential sealing surface that sealingly engages with the shaft outer surface. Alternatively, the base member may be fixedly connected with the shaft and the sealing member may have an outer circumferential sealing surface that sealingly engages with the housing. In both cases, either the shaft rotates within the housing or the housing rotates about the shaft, such that sliding friction is generated between the sealing surface of the sealing member and the outer surface of the shaft or inner surface of the housing.

SUMMARY OF THE INVENTION

In one aspect, the present invention is a seal for sealing a space between a shaft and a housing. The seal assembly comprises a base member coupled with one of the housing and the shaft and a generally annular, elastomeric sealing member sealingly contactable with the other one of the housing and the shaft. The sealing member is coupled with the base member such that the member is circumferentially strained to reduce friction between the sealing member and the other one of the housing and the shaft.

In another aspect, the present invention is a method of forming a seal assembly for sealing a space between a housing and a shaft, the method comprising the steps of: providing a base member having a generally annular carrier portion and a generally annular, elastomeric sealing member; coupling the sealing member with the annular portion of the base member; and plastically deforming at least a section of the base member carrier portion such that the sealing member is circumferentially strained.

In a further aspect, the present invention is a method of sealing a space between a housing and a shaft, the method comprising the steps of: providing a base member having a generally annular portion and a generally annular, elastomeric sealing member; coupling the sealing member with the annular portion of the base member; deforming at least a section of the annular portion such that the sealing member is circumferentially strained; and coupling the base member with one of the housing and the shaft such the sealing member is disposed at least partially within the space and sealingly contacts the other one of the housing and the shaft.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings:

FIG. 4 is an axial cross-sectional view of the seal assembly, shown with the sealing member separate from the base member;

FIG. 5 is an axial cross-sectional view of the seal assembly, shown prior to deforming the base member and with a forming shaft;

FIG. 6 is an axial cross-sectional view of the seal assembly after deformation of the base member.

DETAILED DESCRIPTION OF THE INVENTION

Figure 1:
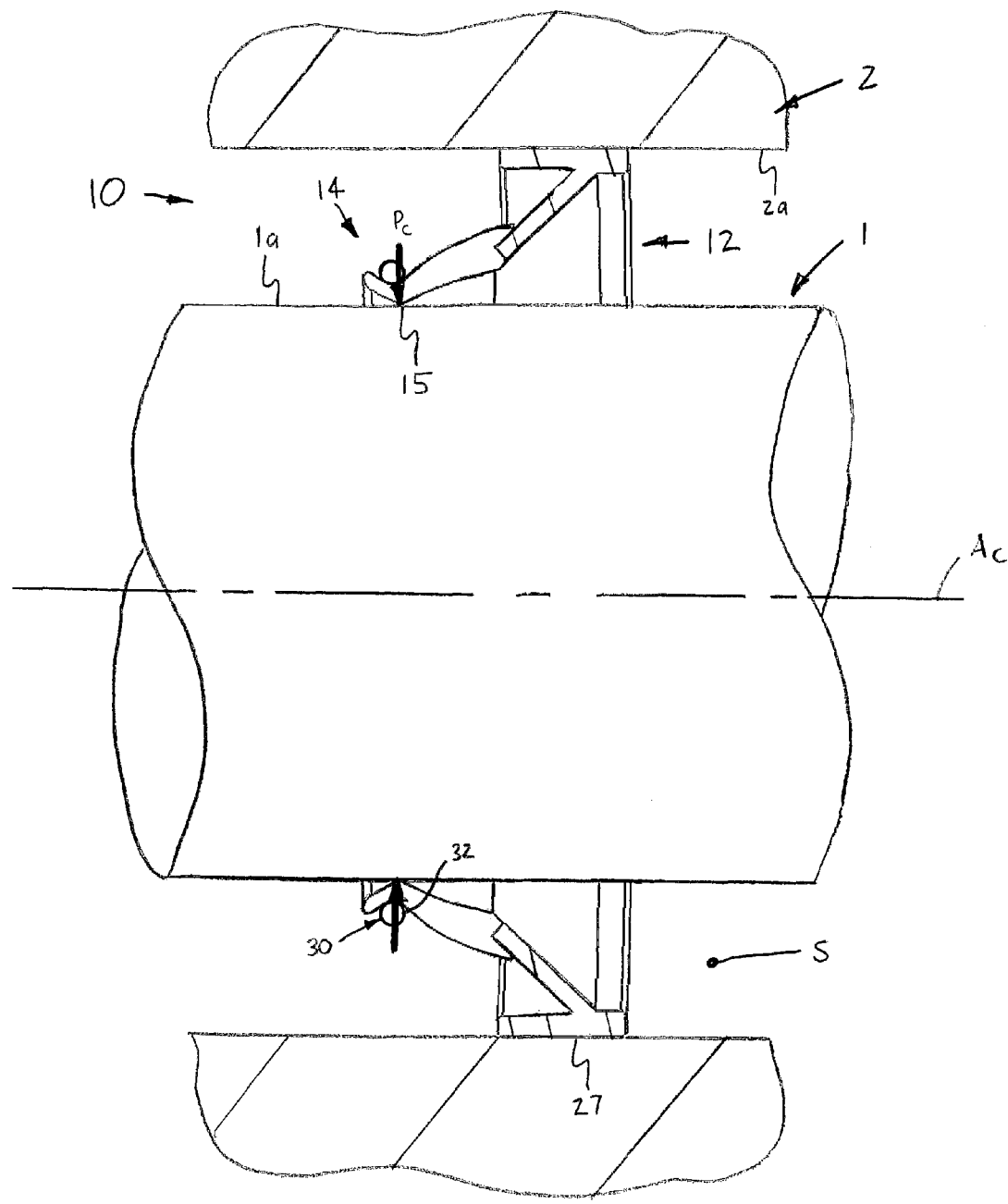
FIG. 1 is an axial cross-sectional view of a seal assembly in accordance with the present invention, shown mounted on a shaft and within a housing.

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Further, as used herein, the word "connected" is intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-7 a seal assembly 10 for sealing a space S between a shaft 1 and a housing 2, at least one of the shaft 1 and the housing 2 being movable relative to the other; preferably, the shaft 1 is rotatable about a central axis $A_C$. The seal assembly 10 basically comprises a base member 12 coupled with one of the housing 2 and the shaft 1, preferably the housing 2, and a generally annular, elastomeric sealing member 14 sealingly contactable with the other one of the housing 2 and the shaft 1, preferably the shaft 1. The sealing member 14 is coupled with the base member 12 such that the sealing member 14 is circumferentially strained so as to reduce friction between the sealing member 14 and the other one of the housing 2 and the shaft 1.

Specifically, the sealing member 14 has a circumferential surface 15 sealingly contactable with a circumferential surface 1a, 2a of the shaft 1 or the housing 2, respectively. Due to stretching or compressing of the sealing member 14 when the member 14 is coupled with the base member 12, the coefficient of friction between the sealing member circumferential surface 15 and the contact surface 1a or 2a is lesser than the coefficient of friction between the surfaces 15 and 1a or 2a which would result were the sealing member 14 engaged the shaft 1 or the housing 2 in a "non-strained" state. Although a detailed description of the material property changes that provide the above-discussed friction reduction is unnecessary and beyond the scope of the present disclosure, it is believed that the primary basis is an increase in material density when under tension or compression.

Further, the sealing member 14 preferably exerts a generally radially directed contact pressure $P_C$ (see FIG. 1) on the shaft 1 or housing 2, which preferably has a magnitude within the range of contact pressures typically present in conventional shaft seals and as such, may be as low as about zero pounds per square inch (0 psi) or greater than 150 psi. At least some contact pressure $P_C$ is generally desirable to ensure sealing engagement even when defects in manufacturing or assembly, such as axial misalignment, lack of concentricity or roundness, etc, are present in the shaft 1, housing 2, or/and seal assembly 10. However, as the sealing member 14 of the present invention is primarily strained due to coupling with the base member 12, the magnitude of the contact pressure $P_C$ is substantially lesser than would be the case if the strain in the member 14 was induced by coupling with the shaft 1 or housing 2.

In other words, if the strain in a sealing member arises due to sizing the member such that it stretches to engage about the shaft 1, or compresses to engage within the housing 2, the resultant circumferential strain generates an additional radially directed pressure that is applied inwardly on the shaft 1 or outwardly against the housing 2. Such radial pressure increases the normal force between the sealing member and the shaft 1 or housing 2, which correspondingly increases the friction between the mating surfaces and thus at least partially counteracts or cancels the friction reduction resulting from the circumferentially strained sealing member 14. In contrast, the base member 12 of the present seal assembly 10 supports or carries at least a substantial portion of the pressure generated in reaction to the straining (i.e., stretching or compressing) of the sealing member 14. Thus, an undesired increase in the normal force at the interface of the sealing surfaces 15 and 1a or 2a is thereby prevented.

Referring to FIGS. 2-6, the sealing member 14 is preferably formed as a generally thin-walled flexible tube 18 having opposing, first and second axial ends 18a, 18b, respectively, inner and outer circumferential surfaces 19A, 19B, respectively, and a central bore 21 defined by the inner surface 19A. The first axial end 18a is connected with the base member 12, most preferably chemically bonded to an annular carrier portion 22 as described in further detail below, and a radially-inwardly extending sealing lip 20 is preferably formed at least generally adjacent to the second axial end 18b. With such a sealing lip 20, the sealing member 14 engages the shaft 1 with a relatively narrow inner circumferential sealing surface 15, which may be provided by the edge of one or more very thin annular shoulders or "beads" (none shown). However, the sealing surface 15 may be provided on any other portion of the sealing member inner surface 19A, such as for example, a relatively wide section of the surface 19A of a tube 18 formed generally "straight-walled" and without the inwardly-extending lip, or any appropriate portion of the outer surface 19B, with or without an outwardly extending lip (none shown), when the sealing member 14 sealingly engages with the housing 2.

Figure 2:
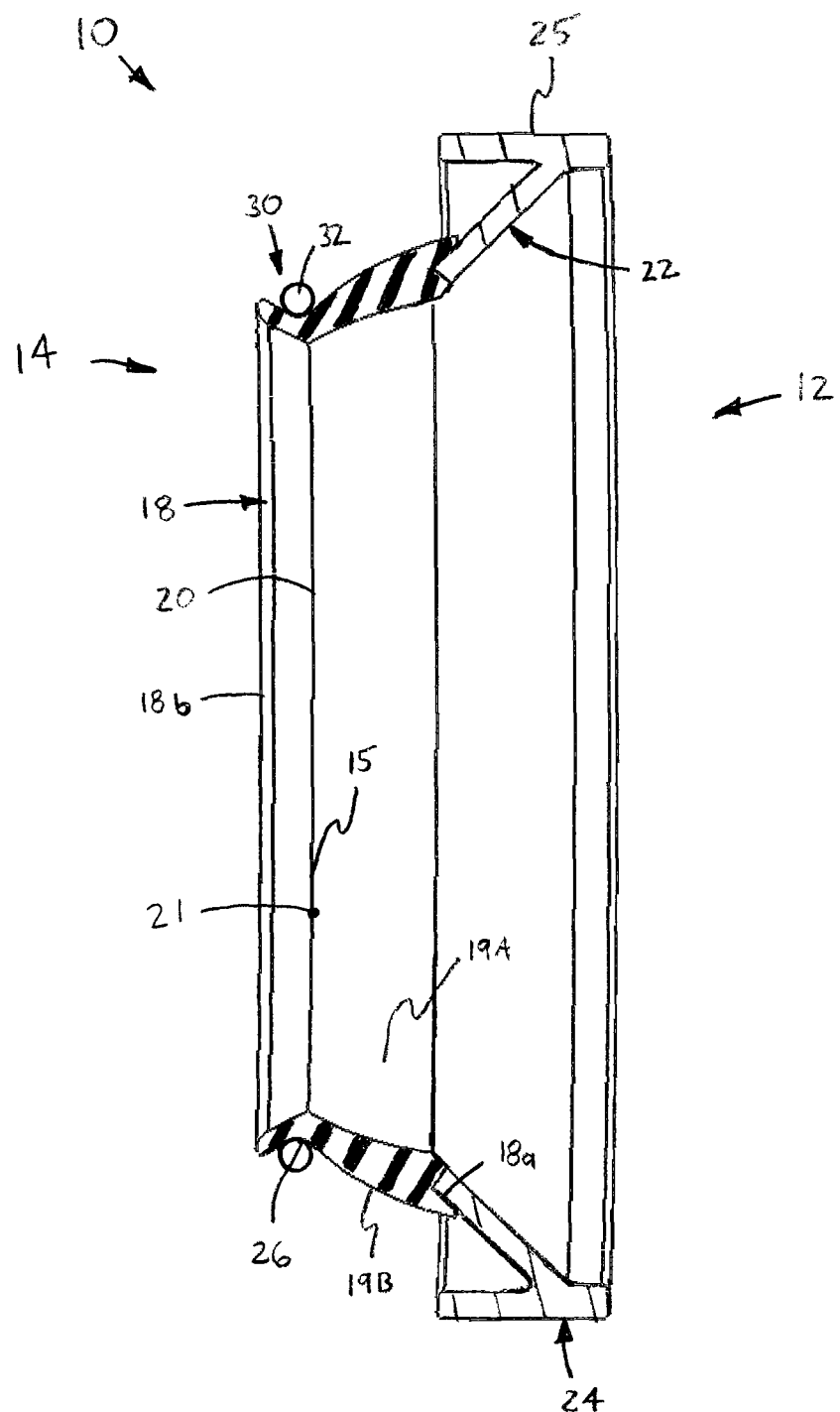
FIG. 2 is an axial cross-sectional view of the seal assembly.

In any construction, the sealing member 14 and the base member carrier portion 22 are sized relative to each other such that the sealing member 14 is diametrically altered or resized to final, desired dimensions either during, or subsequent to, the act of coupling with the base member 12. More specifically, the sealing member 14 has a diameter d with a first value $d_1$ when the member 14 is separate from the base member carrier portion 22 (i.e., in a "free" state), as shown in FIG. 4, and a second value $d_2$ when coupled with the base member carrier portion 22 in a final or operational state of the seal assembly 10, as indicated in FIG. 6. The diameter second value $d_2$ is greater than the diameter first value $d_1$ when the sealing member 14 is stretched, as shown in FIGS. 1, 2 and 6, so as to be under tension when coupled with the base member 12, and the second value $d_2$ is lesser than the first value $d_2$ when the sealing member 14 is compressed (not shown) when coupled with the base member 12.

Thus, in a presently preferred embodiment, the sealing member 14 is initially formed "undersized" such that the central opening 21 has a first diameter value $d_1$ that is smaller than desired and then the member 14 is stretched to increase the central opening 21 to a second, final diameter $d_2$ such that the opening 21 is subsequently resized to receive the shaft 1 with a desired fit. It must be noted that the particular diameter "d" indicated in FIGS. 4 and 6 (i.e., the opening or "lip" diameter) was selected for purposes of illustration only and any other diameter of the sealing member 14 may have been alternatively depicted/indicated as the entire member 14 experiences the same physical changes during circumferential straining.

Figure 7:
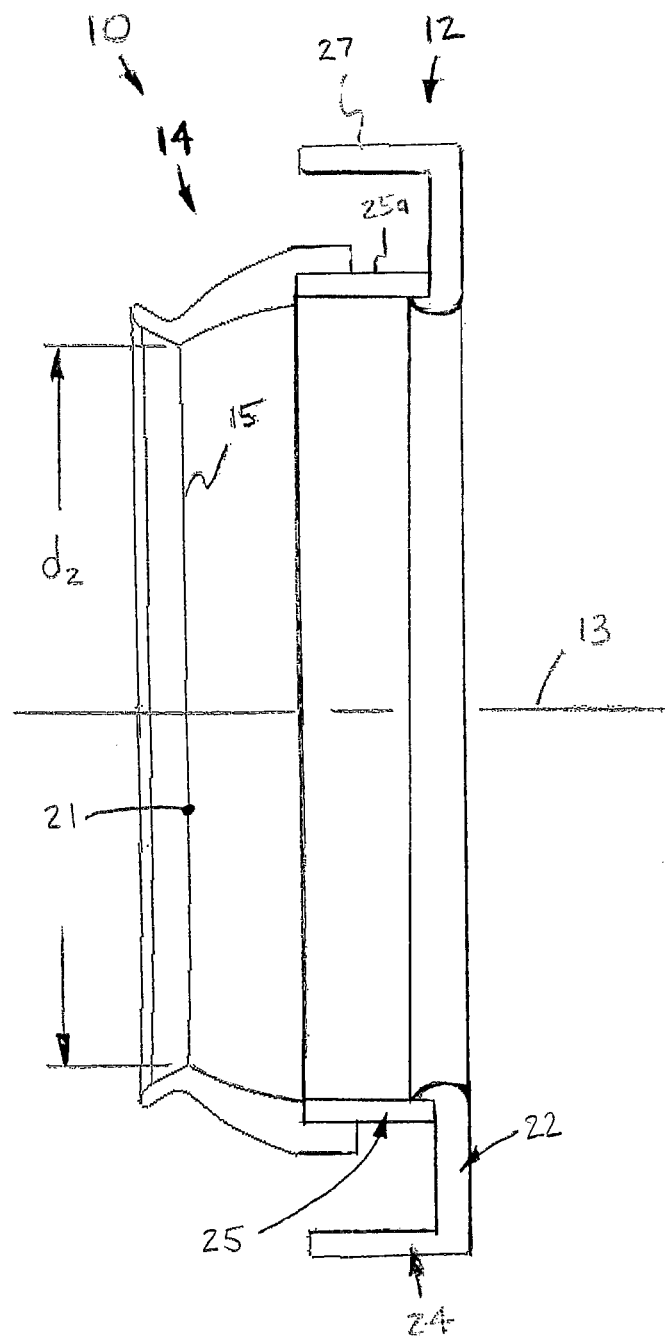
FIG. 7 is an axial cross-sectional view of the seal assembly, shown with an alternative construction of the base member formed of two pieces.

Referring now to FIGS. 4-7, in a presently preferred method of forming the seal assembly 10 as discussed below, the base member 12 and the sealing member 14 are preferably provided as separately formed components, as shown in FIG. 4. The sealing member 14 is first mounted on or attached to the base member carrier portion 22, as shown in FIG. 5, and then the carrier portion 22 is plastically deformed relative to a remainder of the base member 12. During such deformation of the carrier portion 22, the sealing member 14 becomes circumferentially strained and is maintained in a strained state due to permanent deformation of the carrier portion 22. Alternatively, the sealing member 14 may be strained, i.e., either stretched or compressed, during the act of mounting or attaching the sealing member 14 to (or installing within) a base member carrier portion 22 already formed to final dimensions, as shown in FIG. 7.

Referring again to FIGS. 1-7, the base member 12 is preferably formed at least generally similar to a conventional seal casing and is generally annular and extends circumferentially about a central axis 13. Most preferably, the base member 12 includes a radially inner, generally annular carrier portion 22 and a radially outer, generally annular mounting portion 24 integrally formed with the carrier portion 22. The mounting portion 24 is preferably formed as a generally circular band and is coupleable with either the housing 2 or the shaft 1 by any appropriate means. Preferably, the mounting portion 24 is coupled with the housing 2 by means of an interference or friction fit between an outer circumferential surface 27 of the mounting portion 24 and an inner circumferential surface 2a of the housing 2, as shown in FIG. 1.

Further, the carrier portion 22 is preferably formed as a generally circular disk with an outer radial edge 22a integrally formed with the mounting portion 24 and an inner radial edge 22b defining a central bore 23, the sealing member tube 18 being coupled with the inner edge 22b. The carrier portion 22 is sized and configured to receive the sealing member 14, as described above and in further detail below, and is preferably formed so as to extend substantially continuously about the central axis 13 (i.e., as a continuous ring). In certain constructions, the carrier portion 22 includes a separate annular insert 25 having an outer surface 25a and being connected with a remainder of the carrier portion 22, as shown in FIG. 7. The annular insert 25 is sized such that the sealing member 14 is stretched to engage about at least a portion of the outer surface 25a, thereby sizing the member 14 to the second or desired operational diameter value $d_2$, and then the insert 25 is connected to the remainder of the carrier portion 22 by any appropriate means (e.g., welding, brazing, friction, etc.). Preferably, the base member 12 is fabricated of a metallic material, such as for example low carbon steel or aluminum, but may alternatively formed of any other appropriate material, such for example, a rigid polymeric material, a ceramic, etc.

Figure 3:
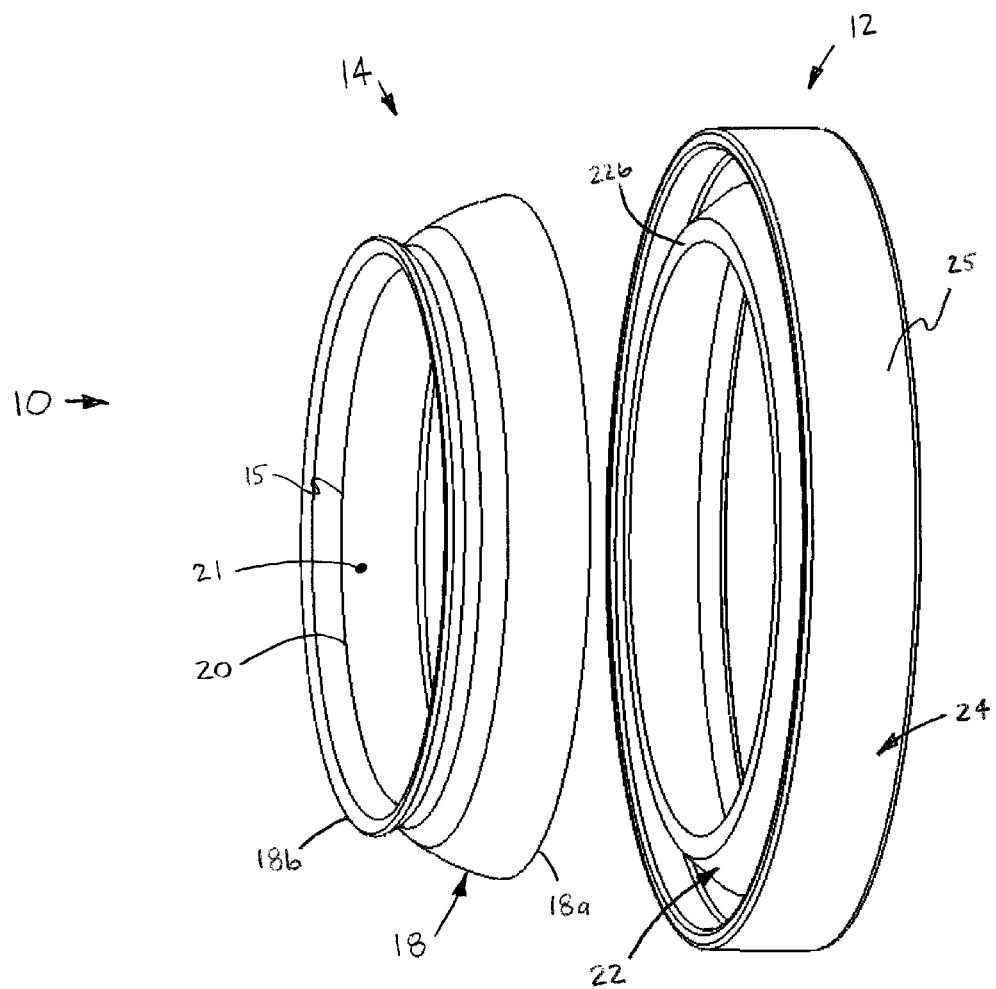
FIG. 3 is an exploded, perspective view of the seal assembly.

As discussed above, the carrier portion 22 is preferably plastically or permanently deformed relative to the mounting portion 24 subsequent to coupling the sealing member 14 with the carrier portion 22, so as to thereby circumferentially strain the sealing member 14. In a presently preferred embodiment, the sealing member 14 is preferably chemically bonded onto the inner edge 22*b* of the carrier portion 22, but may be attached or coupled to the carrier portion 22 by any other appropriate means (e.g., friction). Then, the carrier portion 22 is plastically deformed by using appropriate tooling to bend or deform at least the inner edge 22*b* so as to displace at least partially radially outwardly, and preferably both radially and axially in an outward bending direction $D_B$, with respect to the base member mounting portion 24, as indicated in FIG. 5. For example, an end of a straight circular shaft ST (shown in phantom in FIG. 5) may be disposed against the carrier portion 22, or a tapered shaft (not shown) may be inserted into the carrier portion bore 23, and then the particular "forming" shaft is displaced axially in a direction $D_A$ along the body centerline 13 so as to bend or deform the carrier portion 22 into a generally frustaconical shape, as shown in FIGS. 1, 2 and 3. However, the base member carrier portion 22 may be deformed, bended, displaced, etc., radially outwardly or inwardly, in any other appropriate manner and by any appropriate means.

Referring to FIGS. 1 and 2, the seal assembly 10 preferably further comprises a biasing member 30 for maintaining contact between the sealing member 14 and the shaft 1 or the housing 2. Most preferably, the biasing member 30 is disposed about the sealing member 14 and is configured to bias the sealing member 14 generally radially inwardly toward the shaft 1, so as to establish the contact pressure $P_C$. The preferred biasing member 30 includes a generally circular garter spring 32 and the sealing member 14 preferably has a generally annular groove 26 formed in the outer surface 19B and sized to receive at least a portion of the spring 32. However, the biasing member 30 may be formed in any other appropriate manner (e.g., as an O-ring) or the sealing assembly 10 may be formed or fabricated without any such biasing member.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined in the appended claims.

We claim:

1. A seal for sealing a space between a shaft and a housing, the seal assembly comprising:
    a base member coupled with one of the housing and the shaft; and
    a generally annular, elastomeric sealing member sealingly contactable with the other one of the housing and the shaft and being coupled with the base member such that the sealing member is circumferentially strained to reduce friction between the sealing member and the other one of the housing and the shaft;
    wherein the sealing member has a diameter with a first value when separate from the base member and a second value when coupled with the base member, the second value being one of greater than the first value and lesser than the first value.

2. The seal assembly as recited in claim 1 wherein the base member has a generally annular carrier portion and the sealing member is coupled with the base member carrier portion.

3. The seal assembly as recited in claim 2 wherein the base member has a central axis and the base member carrier portion extends substantially continuously about the central axis.

4. The seal assembly as recited in claim 2 wherein the base member further includes a mounting portion coupleable with the one of the housing and the shaft and integrally formed with the carrier portion, the carrier portion being plastically deformed relative to the mounting portion subsequent to coupling the sealing member with the carrier portion.

5. The seal assembly as recited in claim 2 wherein the base member carrier portion includes a generally annular insert, the sealing member being stretched about at least a portion of the insert and the insert being connected with a remainder of the base member.

6. The seal assembly as recited in claim 1 wherein one of:
    the diameter second value is greater than the diameter first value such that the sealing member is under tension when coupled with the base member; and
    the diameter second value is lesser than the diameter first value such that the sealing member is under compression when coupled with the base member.

7. The seal assembly as recited in claim 1 wherein the shaft is rotatable about a central axis, the base member is coupled with the housing, and the sealing member is under tension and sealingly contactable with the shaft.

8. The seal assembly as recited in claim 7 further comprising a biasing member disposed about the sealing member and configured to bias the sealing member generally radially inwardly toward the shaft.

9. A method of forming a seal assembly for sealing a space between a housing and a shaft, the method comprising the steps of:
    providing a base member having a generally annular carrier portion and a generally annular, elastomeric sealing member, the sealing member having a central opening with a diameter, the diameter having a first value;
    coupling the sealing member with the annular portion of the base member;
    circumferentially straining the sealing member such that the sealing member diameter has a second value and the central opening is sized to receive the shaft with a desired fit; and
    wherein the step of circumferentially straining the sealing member includes one of:
        plastically deforming at least a section of the base member carrier portion such that the sealing member is circumferentially strained;
        providing an annular insert and stretching the sealing member to engage about at least a portion of the insert; and
        stretching the sealing member to engage with a portion of the base member carrier portion.

10. The method as recited in claim 9 wherein the step of coupling the sealing member to the base member carrier portion includes chemically bonding the sealing member to the carrier portion.

11. The method as recited in claim 9 wherein:
    the step of providing the base member includes providing a base member further having a central axis and a mounting portion, the carrier portion being integrally connected with and extending at least partially axially from the mounting portion; and the step of plastically deforming the base member carrier portion includes bending the carrier portion at least partially radially with respect to the mounting portion.

12. A method of sealing a space between a housing and a shaft, the method comprising the steps of:

providing a base member having a generally annular portion and a generally annular, elastomeric sealing member;

coupling the sealing member with the annular portion of the base member; deforming at least a section of the base member annular portion such that the sealing member is circumferentially strained; and coupling the base member with one of the housing and the shaft such the sealing member is disposed at least partially within the space and sealingly contacts the other one of the housing and the shaft.

13. The method as recited in claim 12 wherein:

the step of providing the base member includes providing a base member further having a central axis and a mounting portion, the carrier portion being integrally connected with and extending at least partially axially from the mounting portion; and the step of deforming the base member carrier portion includes bending the carrier portion at least partially radially with respect to the mounting portion.

14. A seal for sealing a space between a shaft and a housing, the seal assembly comprising:

a base member coupled with one of the housing and the shaft; and a generally annular, elastomeric sealing member sealingly contactable with the other one of the housing and the shaft and being coupled with the base member such that the sealing member is circumferentially strained to reduce friction between the sealing member and the other one of the housing and the shaft;

wherein the base member has a generally annular carrier portion and the sealing member is coupled with the base member carrier portion; and wherein the sealing member has a diameter and the base member carrier portion is sized relative to the sealing member such that the sealing member diameter has a first value when separate from the base member carrier portion and a second value when coupled with the base member carrier portion, the second value being one of greater than the first value and lesser than the first value.

* * * * *